United States Patent [19]

McLain

[11] Patent Number: 5,297,569
[45] Date of Patent: Mar. 29, 1994

[54] METHOD AND APPARATUS FOR MAINTENANCE OF WHEEL BEARINGS

[76] Inventor: William B. McLain, 61 Peterboro, Detroit, Mich. 48201

[21] Appl. No.: 938,888

[22] Filed: Aug. 31, 1992

[51] Int. Cl.⁵ .............................................. B08B 3/04
[52] U.S. Cl. .................................. 134/143; 134/149; 134/158; 134/147
[58] Field of Search ............... 134/142, 140, 137, 143, 134/149, 158, 162, 147, 79, 87, 92, 152, 153, 85

[56] References Cited

U.S. PATENT DOCUMENTS

| | | | |
|---|---|---|---|
| 620,682 | 3/1899 | Swartz . | |
| 1,012,804 | 12/1911 | Bryant . | |
| 1,016,473 | 2/1912 | Burgers et al. | 134/149 |
| 1,345,226 | 6/1920 | Paris . | |
| 1,766,208 | 6/1930 | Anstiss | 134/152 X |
| 1,814,592 | 7/1931 | Geiger | 134/149 X |
| 1,894,786 | 1/1933 | Pew | 134/152 X |
| 2,408,958 | 10/1946 | Smith | 134/152 X |
| 2,493,291 | 1/1950 | Hirsch | 134/152 |
| 2,652,350 | 9/1953 | Dailey | 134/162 X |
| 2,652,843 | 9/1953 | Schuchman | 134/149 X |
| 2,721,567 | 10/1955 | Tierney . | |
| 2,784,724 | 3/1957 | Fisher . | |
| 2,823,682 | 2/1958 | Coulter | 134/152 X |
| 3,108,031 | 10/1963 | Hasala et al. | 134/153 |
| 3,116,745 | 1/1964 | Burning . | |
| 3,482,584 | 12/1969 | Schipke | 134/149 X |
| 4,757,831 | 7/1988 | Ingermann et al. . | |

FOREIGN PATENT DOCUMENTS 182943  7/1922  United Kingdom .

*Primary Examiner*—Frankie L. Stinson
*Attorney, Agent, or Firm*—Dykema Gossett

[57] ABSTRACT

A method and apparatus for cleaning and lubricating bearings includes the steps of placing the bearings on posts on a rotating member, and rotating the member within a container containing a cleaning solvent. The rotating member is then removed from the cleaning solvent, and a lubricant is placed within the container. The rotating member is then reinserted into the container and the bearings are rotated within the lubricant.

2 Claims, 2 Drawing Sheets

METHOD AND APPARATUS FOR MAINTENANCE OF WHEEL BEARINGS

BACKGROUND OF THE INVENTION

This invention relates to a method of cleaning and lubricating bearings, and further to an apparatus for performing such a method.

Bearings are utilized in many modern devices. As examples, wheel bearings used in rollerblades, skateboards or inline skates are subjected to extreme use conditions. A pair of inline skates may employ eight to ten bearings per skate. The wheel bearings are often used for extended lengths of travel, and through adverse environmental conditions. Given such conditions, maintenance of the wheel bearings becomes important. Given the fact that several devices which utilize wheel bearings are owned and operated by young or busy individuals, the maintenance should preferably be a simple procedure. No simple method or apparatus has been developed for maintaining bearings, including the cleaning and lubrication of the bearings.

It is therefore an object of the present invention to disclose a method and apparatus for cleaning and lubricating wheel bearings which is relatively simple.

SUMMARY OF THE INVENTION

In a method according to the present invention, a rotary member includes structure for mounting bearings, and then rotating the bearings within a container. The container is preferably initially filled with a cleaning solvent, such as acetone, and the bearings are placed on the rotary member and rotated within the acetone. The rotary member is then removed from the container. The cleaning solvent is removed from the container, and a lubricant is placed within the container. The rotary member is then rotated within the container to lubricate the bearings.

In a preferred embodiment of the present invention, the rotary member includes a handle which rotates within a top plate. A central post rotates with the handle and has four bearing mount posts extending outwardly from the central post. The central post is preferably aligned in a hole in a bottom plate which is positioned within tile container. The alignment of the post in the hole provides a structure to ensure the rotary member rotates about a central axis of the container. The mount posts each include a threaded surface at an outer axial end. An end locking member, such as a nut, can be locked on the threaded surfaces securing the wheel bearings on the mount posts. The mount posts have an outer diameter that is less than the inner diameter of the bore in the bearings, while the nut has an outer diameter which is greater than the inner diameter of the bore in the bearings. The nut thus locks the bearings on the mount posts.

These and other features of the present invention can be best understood from the following specification and drawings, of which the following is a brief description.

DETAILED DESCRIPTION OF A PREFERRED EMBODIMENT

Figure 1:
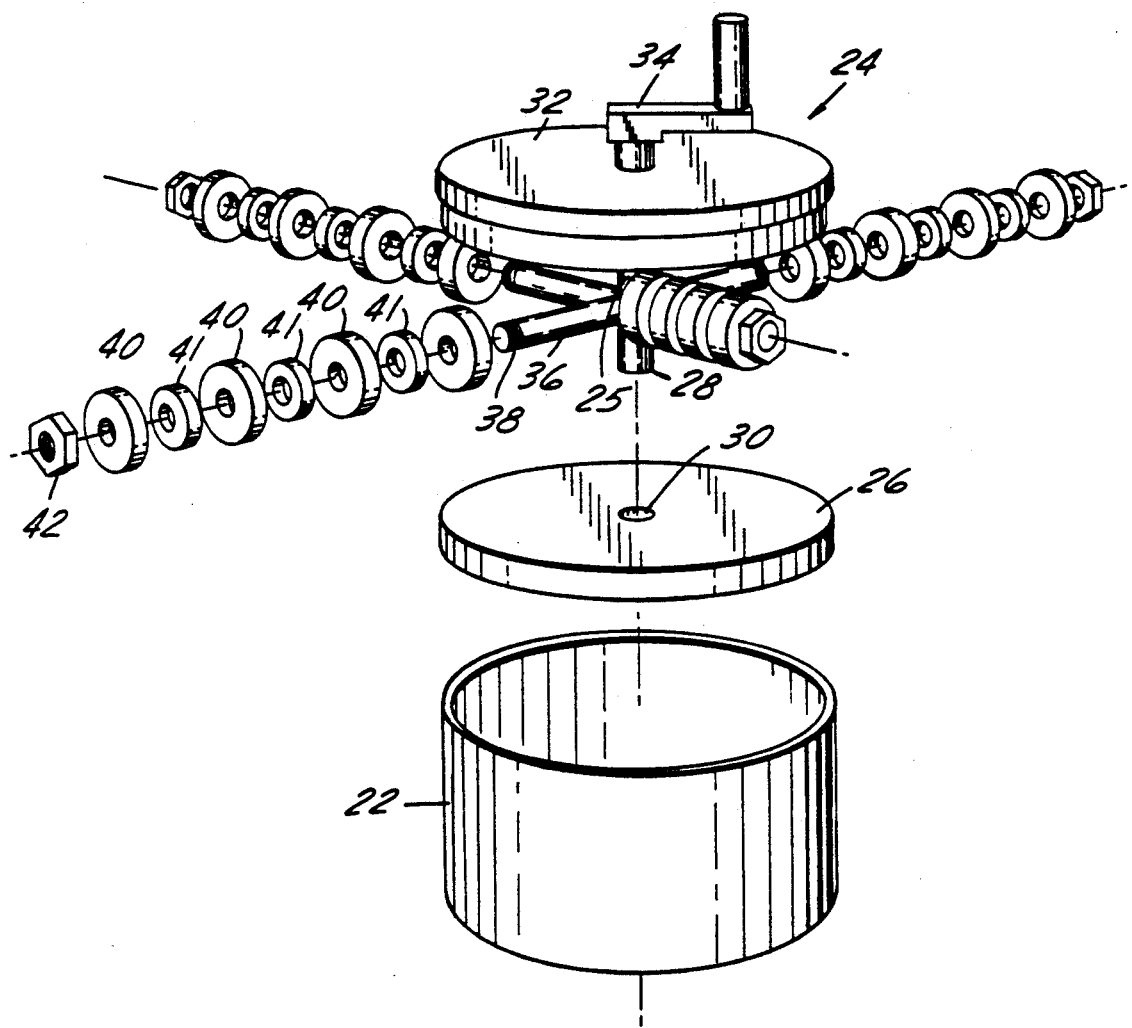
FIG. 1 is an exploded view of the apparatus for performing the invention.

An apparatus for maintaining bearings is illustrated in FIG. 1. A container 22 receives a rotary member 24 and a bottom plate 26. Rotary member 24 has a central post 25 with a bottom end 28 received in a central opening 30 in bottom plate 26. Central post 25 rotates relative to bottom plate 26. The positioning of end 28 in opening 30 ensures that the rotary member is properly mounted for rotation within container 22.

A top plate 32 encloses container 22, and a handle 34 rotates rotary member 24 relative to top plate 32. Mount posts 36 extend outwardly of central post 25, and have threaded surfaces 38 at their outer ends. Bearings 40 are mounted on mount posts 36. Spacers 41 are placed between bearings 40 to ensure that cleaning solvents, such as acetone, reach the entirety of bearings 40. Nuts 42 are placed on threaded surfaces 38 to secure the bearings 40 on mount posts 36. Although the invention has been described with reference to cleaning and lubricating bearings, it should be understood that other members having a central bore can be cleaned and lubricated on the inventive structure.

Figure 2:
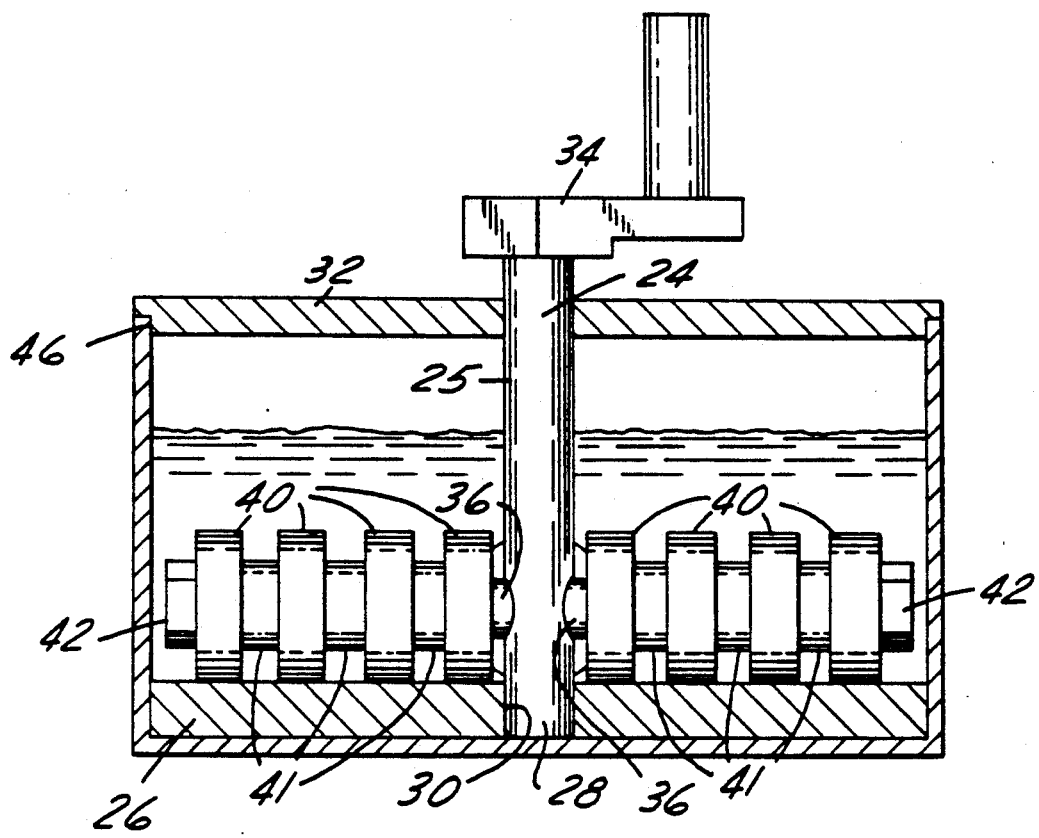
FIG. 2 is a cross-sectional view through the assembled apparatus.

The operation of the inventive apparatus will now be described with reference to FIG. 2. As shown in FIG. 2, the wheel bearings 40 have been mounted on mount posts 36, with nut 42 received on the end of mount posts 36. Spacers 41 are placed intermediate bearings 40. Solvent 44 is poured within container 22. Top plate 32 is placed on container 22. As shown, top plate 32 has an inner boss 46 which fits within the inner wall of container 22 to provide a tight fit. Handle 34 may then be rotated, and mount posts 36 and bearings 40 rotate within container 22. The solvent 44 will then clean and remove any impurities from bearings 40.

It is preferred the handle 34 is alternatively rotated clockwise and then counterclockwise. Further, a downward force is preferably applied on handle 34 such that the bearings 40 roll along bottom plate 26. This also ensures the bearings 40 are properly cleaned.

Once the wheel bearings 40 have been cleaned, the top plate 32 and rotary member 24 are removed from container 22. The solvent is removed from container 22 and the container is wiped off. A lubricant may then be placed within container 22. Top plate 32 is reinserted within container 22 and handle 34 is again rotated relative to top plate 32 and container 22. The rotary member 24 may again be rotated in both directions. The solvent and lubricant are preferably poured through a filter when being removed from the container 22.

Figure 3:
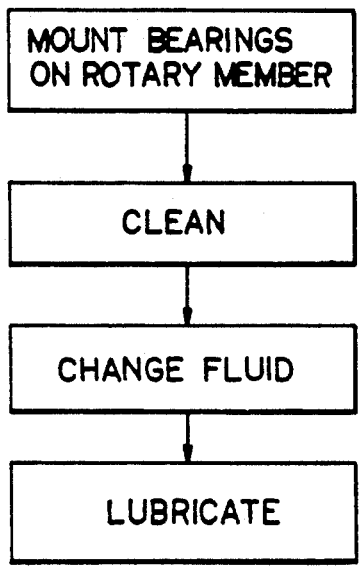
FIG. 3 is a flow chart of the inventive method.

FIG. 3 illustrates the basic inventive method. Parts to be cleaned, which are preferably bearings, are mounted on the rotary member and placed within a container including a cleaning solvent such as acetone. The rotary member is rotated within the container. The rotary member is removed from the container, and the solvent is removed from the container. A lubricant such as oil is then placed within the container. The rotary member is replaced within the container, and rotated within the container. The bearings may then be placed on a device for use such as a pair of rollerblades. Although the present invention discloses the use of a single container, and it is preferred that a single container be utilized to simplify the method, it would also be within the scope of this invention to utilize two separate containers, one for cleaning, and one for lubricating.

For environmental purposes it is important that the rotary member 24 with bearings 40 thereon is initially raised from the container 22 so as to permit or to allow the solvent to drip into the washer container 22. Thereafter the solvent from container 22 is poured through a filter screen, not shown, into another approved container for subsequent use if the acetone is clean. If not, the solvent is disposed of according to local or state fire ordinances. The grit on the filler screen is discarded and the screen is cleaned for reuse. The container 22 is wiped clean of the solvent. The same procedure is followed after the lubricating step has been completed.

Although a preferred embodiment of the present invention has been disclosed, it should be understood that various modifications would come within the scope of this invention. For that reason the following claims should be studied in order to determine the true scope and content of this invention.

What is claimed is:

1. An apparatus for cleaning or lubricating wheel bearings with bores comprising:

a container having an enclosed bottom, a side wall and an open top for holding a cleaning solvent or a lubricant;

a top plate provided with a centrally located opening enclosing said open top;

a rotary member having a central axis extending through said opening, rotatably mounted within said top plate, and extending into the interior of said container;

a bottom plate received within the enclosed bottom of said container, said bottom plate having upper and lower surfaces, with said lower surface abutting said enclosed bottom, said bottom plate having a central hole;

said rotary member having a first end portion rotatably received within said central hole of said bottom plate to properly guide said rotary member and a second end portion extending through said centrally located opening in said top plate;

four elongated cylindrical mount posts for telescopically mounting the wheel bearings, said mount posts being spaced 90° apart and having inner and outer ends, the inner ends of said mount posts being received in openings provided in said rotary member, said mount posts extending radially outwardly from said rotary member toward the side wall of said container, and the outer ends of said mount posts being threaded;

locking members positioned on the outer threaded ends of said mount posts, said locking members having an outer dimension which is greater than the inner diameter of the bores in the wheel bearings on said mount posts, each locking member being a nut which is threaded onto the threaded outer end of the corresponding post to retain the wheel bearings thereon; and a handle located exteriorly of said container and connected to said second end portion of said rotary member for turning the rotary member and the posts and wheel bearings carried thereby within the solvent or lubricant in said container relative to said top plate;

said handle and said rotary member when rotated causing the wheel bearings to roll along the upper surface of said bottom plate.

2. An apparatus as recited in claim 1, wherein each of said mount posts receive a plurality of wheel bearings to be cleaned, and spacers are positioned on said mount posts intermediate said wheel bearings.

* * * * *